United States Patent [19]
Shimamura et al.

[11] Patent Number: 4,896,699

[45] Date of Patent: Jan. 30, 1990

[54] SOLENOID VALVE

[75] Inventors: Morihiko Shimamura; Hitoshi Takaku, both of Saitama, Japan

[73] Assignee: Jidosha Kiki Co., Ltd., Tokyo, Japan

[21] Appl. No.: 352,486

[22] Filed: May 16, 1989

[30] Foreign Application Priority Data

May 31, 1988 [JP] Japan ............................ 63-72349[U]

[51] Int. Cl.[4] ............................................ F16K 31/06

[52] U.S. Cl. ............................... 137/630; 251/129.15; 335/262

[58] Field of Search .................... 137/630; 251/129.15; 335/262

[56] References Cited

U.S. PATENT DOCUMENTS

| | | | |
|---|---|---|---|
| 3,241,005 | 3/1966 | Morris | 335/262 X |
| 4,759,255 | 7/1988 | Shimamura | 137/630 X |
| 4,826,130 | 5/1989 | Griffith | 251/129.15 |
| 4,836,248 | 6/1989 | Stegmaier | 251/129.15 X |

*Primary Examiner*—Robert G. Nilson

*Attorney, Agent, or Firm*—Flynn, Thiel, Boutell & Tanis

[57] ABSTRACT

In a conventional solenoid valve, a solenoid coil is disposed on a spool of a non-magnetic material, which forms a magnetic path therefor. By contrast, according to the invention, a sleeve-shaped guide which is formed as part of a spacer of a magnetic material is fitted into the spool and a plunger is slidably fitted into the guide, so that the plunger and the spacer define part of the magnetic path for the solenoid, thus allowing an improved magnetic path to be defined.

8 Claims, 3 Drawing Sheets

SOLENOID VALVE

FIELD OF THE INVENTION

The invention relates to a solenoid valve, and in particular, to a solenoid valve which is preferred for containment within a shell of a brake booster.

DESCRIPTION OF THE PRIOR ART

A solenoid valve adapted to be received in a shell of a brake booster is known in the art (see U.S. Pat. No. 4,759,255) comprising a first casing on which a valve seat is formed for allowing a valve element to be seated thereon, a second casing connected to the first casing and having a cylindrical configuration with a closed bottom, a solenoid disposed as a winding on a sleeve-shaped spool and contained within the second casing, an annular spacer interposed between the solenoid and the first casing to form a magnetic path for the solenoid together with the second casing, and a plunger slidably fitted in the spool and connected to the valve element.

In a conventional solenoid valve as mentioned above, a spool on which a solenoid coil is disposed is manufactured from a non-magnetic material such as synthetic resin, and the annular spacer is fitted around the spool while the plunger is slidably fitted inside the spool. Consequently, a gap is formed between the spacer and the plunger having a magnitude which corresponds to at least the thickness of the spool, thus reducing the attractive force exerted upon the plunger.

SUMMARY OF THE INVENTION

In view of the foregoing, in accordance with the invention, a sleeve-shaped guide is formed within the axial portion of the spacer in a solenoid valve as mentioned above, and the guide is fitted into the spool and the plunger is slidably fitted inside the guide.

When the sleeve-shaped guide is formed in the annular spacer, which defines a magnetic path for the solenoid together with the second casing, and the plunger is slidably fitted inside the sleeve-shaped guide, a gap is prevented from being formed by the spool between the spacer and the plunger as in the prior art. In this manner, the attractive force exerted upon the plunger can be increased by a corresponding amount.

Above and other objects, features and advantages of the invention will become apparent from the following description of several embodiments thereof shown in the attached drawings.

DETAILED DESCRIPTION OF EMBODIMENTS

Figure 1:
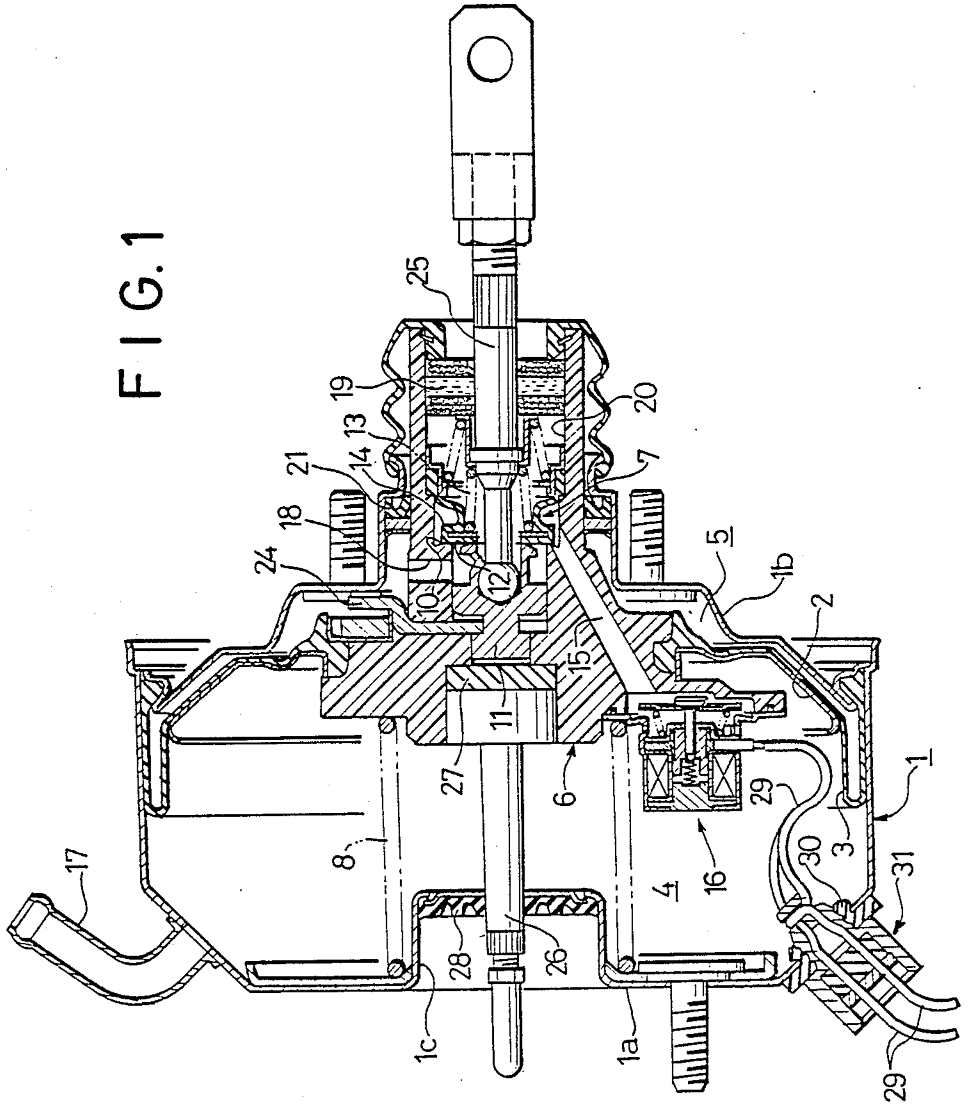
FIG. 1 is a side elevation, partly in section, of a solenoid valve according to one embodiment of the invention as applied to a brake booster.

Referring to the drawings, an embodiment of a solenoid valve according to the invention as assembled into a brake booster will be described. In FIG. 1, a brake booster includes a shell 1 defined by a combination of a front shell 1*a* and a rear shell 1*b*, and a power piston 2 is slidably disposed within the shell 1. A diaphragm 3 is applied to the back surface of the power piston 2, whereby the combination of the power piston 2 and the diaphragm 3 divides the interior of the shell 1 into a forwardly located, constant pressure chamber 4 and a rearwardly located, variable pressure chamber 5.

A valve body 6 is formed integrally with an axial portion of the power piston 2, and receives a valve mechanism 7, which operates to switch a flow path. The power piston 2 and the valve body 6 are normally maintained in their inoperative positions shown, by a return spring 8.

The valve mechanism 7 includes a first valve seat 10 formed on the valve body 6, a second valve seat 12 formed on a valve plunger 11, and a valve element 14 which is adapted to be seated upon either valve seat 10 or 12 under the resilience of a spring 13 from the back side of the power piston 2 or from the right-hand side, as viewed in FIG. 1.

A space disposed outwardly of a seal defined by the first valve seat 10 and the valve element 14 communicates with the constant pressure chamber 4 through a passage 15 and a solenoid valve 16, with the chamber 4 communicating with a source of negative pressure such as an intake manifold of an engine, not shown, through a tubing 17 mounted on the shell 1 for introducing a negative pressure.

On the other hand, a space intermediate a seal defined between the first valve seat 10 and the valve element 14 and another seal defined between the second valve seat 12 and the valve element 14 communicates with the variable pressure chamber 5 through a passage 18 formed in the valve body 6. Finally, a space disposed inside a seal defined between the second valve seat 12 and the valve element 14 communicates with the atmosphere through a passage 20 in which a filter 19 is disposed. The variable pressure chamber 5 is hermetically sealed against the exterior by a seal member 21 through which the valve body 6 slidably extends.

The valve plunger 11 which forms the valve mechanism 7 is prevented from being withdrawn from the valve body 6 by a key member 24, and has its end connected to an input shaft 25 which is mechanically coupled to a brake pedal, not shown. On the other hand, the inner end face of the valve plunger 11 is disposed in opposing relationship with an end face of an output shaft 26 with a reaction disc 27 interposed between the opposing surfaces.

An axial portion of the front shell 1*a* is formed with a reentrant portion 1*c* which projects into the shell 1 and in which an opening is formed to allow the output shaft 26 to project externally for connection with a piston of a master cylinder, not shown. The opening formed in the reentrant portion 1*c* is closed by a seal member 28 fitted therein, thus maintaining the interior of the front shell 1*a* as hermetically sealed.

The solenoid valve 16 is disposed within the constant pressure chamber 4 and is mounted on the valve body 6 at a position outside and below the return spring 8, and allows a braked condition to be maintained after a brake pedal is released, by causing the solenoid valve 16 to close the passage 15 formed in the valve body 6 when the brake booster is operated.

A pair of harness wires 29 extend from the solenoid valve 16 and are taken externally of the shell 1 by passing through a seal unit 31 disposed in an opening 30 formed in the front shell 1*a* and acting to maintain a hermetic seal, for connection with a controller including a microcomputer, not shown.

Figure 2:
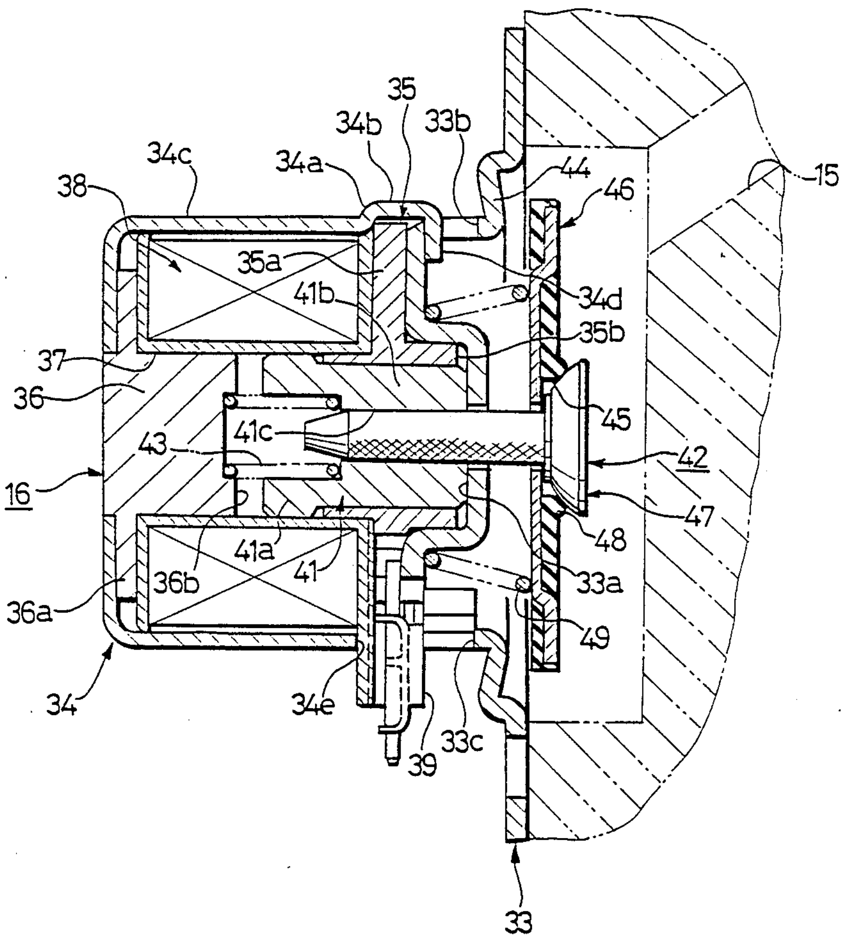
FIG. 2 is an enlarged view, partly in section, of the solenoid valve shown in FIG. 1.

As illustrated to an enlarged scale in FIG. 2, the solenoid valve 16 comprises a first, substantially dish-shaped casing 33 mounted on the valve body, as hermetically sealed, so as to cover the opening of the passage 15 into the constant pressure chamber 4, a second, substantially cup-shaped casing 34 integrally connected to the casing 33, and a spacer 35 interposed between the both casings 33, 34.

The first, dish-shaped casing 33 is formed of a non-magnetic material such as aluminium and is formed with a cylindrical recess 33*a* in axial alignment and toward the second casing 34. The spacer 35 is formed of a magnetic material, and includes an annular portion 35*a* and a sleeve-shaped guide 35*b* which extends in both directions axially from the annular periphery of the annular portion 35*a*. By fitting the sleeve-shaped guide 35*b* into the recess 33*a* of the first casing 33, the both members are coupled together in axial alignment with each other.

On the other hand, the second, cup-shaped casing 34 is formed of a magnetic metal material and includes a bottom wall at its left end on which a plug 36 of a magnetic material is mounted in axial alignment. The second casing 34 is formed with a step 34*a* toward its right-hand open end, thus defining a section 34*b* of a greater diameter and a section 34*c* of a smaller diameter on the right and left sides thereof. A solenoid 38 comprising a winding of wire and disposed on a spool 37 formed of synthetic resin is received inside the section 34*c*.

The annular portion 35*a* of the spacer 35 is fitted inside the section 34*b* of the second casing 34 which has a greater diameter, and the outer periphery of the annular portion 35*a* is disposed in abutment against the step 34*a* in the second casing 34. At the same time, the spool 37 of the solenoid 38 is held between a flange 36*a* of the plug 36 and the spacer 35 to fix the solenoid 38 in the axial direction. An axial portion 36*b* of the plug 36 and the sleeve-shaped guide 35*b* of the spacer 35 are fitted into the spool 37 from the opposite sides, whereby the spool 37 is positioned in alignment with the axis which is common to the first casing 33, the spacer 35 and the second casing 34.

Under this condition, a tab 34*d* formed at the right end of the second casing 34 is caulked into an opening 33*b* formed in the first casing 33, thus integrally connecting the first casing 33, the spacer 35 and the second casing 34 together.

Figure 3:
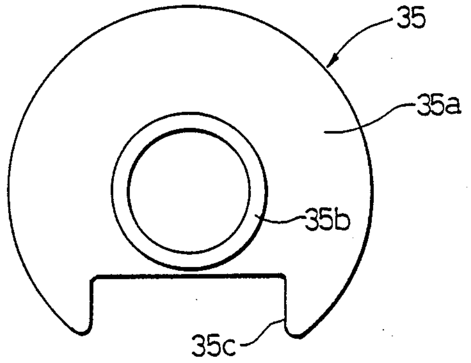
FIG. 3 is a front view of a spacer 35.

The solenoid 38 is provided with a connector 39 which is provided for connection with the harness wires 29, and a notch 35*c* (see FIG. 3) is formed in the spacer 35 in order to avoid an interference with the connector 39. Openings 33*c* and 34*e* are formed in the first casing 33 and the greater diameter section 34*b* of the second casing 34, respectively, to allow the connector 39 to project outwardly.

A plunger 41 is slidably fitted into the spool 37 of the solenoid 38 and into the sleeve-shaped guide 35*b* of the spacer 35, and is connected to valve means 42 which operates to open or close the passage 15.

Specifically, the plunger 41 includes a portion 41*a* of a greater diameter which fits in the spool 37 of the solenoid 38, a portion 41*b* of a smaller diameter which fits in the sleeve-shaped guide 35*b* of the spacer 35, and a stepped opening 41*c* which axially extends therethrough. A spring 43 is disposed between an end face of the step defined by the stepped opening 41*c* and the plug 36 to urge the plunger 41 to the right, whereby the plunger 41 is normally maintained in its inoperative position where the right end face thereof bears against the end face of the recess 33*a* which is formed in the axial portion of the first casing 33.

The valve means 42 is adapted to be seated upon a valve seat 44 formed on the first casing 33 at a selected position to close the passage 15. The valve means 42 includes a first valve element 46 in the form of a ring having an increased diameter having a seat defined around its outer periphery which is adapted to be fitted upon the valve seat 44 and also having a communication passage 45 communicating with the passage 15 around its inner periphery, and a second valve element 47 in the form of a poppet slidably extending through an axial portion of the first valve element 46 and connected to the plunger 41. The second valve element 47 in the form of a poppet is adapted to be seated upon a valve seat 48, formed around the inner periphery of the first valve element 46, from the right-hand side, thereby closing the communication passage 45.

The second valve element 47 includes an axial portion, the surface of which is knurled in a direction transverse to the axial direction and which is a press fit in the stepped opening 41*c* of the plunger 41, thus integrally connecting the second valve element 47 to the plunger 41.

A spring 49 is disposed between the first valve element 46 in the form of a ring and the first, dish-shaped casing 33, and when the plunger 41 assumes its inoperative position where it abuts against the first casing 33, the resilience of the spring 49 is effective to maintain the first valve element 46 in abutment against the second valve element 47 which is integral with the plunger 41. Under this condition, the seat of the first valve element 46 is spaced from the valve seat 44 formed on the first casing 33, and accordingly, the passage 15 communicates with the constant pressure chamber 4 through a clearance between the first valve element 46 and the valve seat 44 and the openings 33*b*, 33*c* formed in the first casing 33.

In the described arrangement, when a brake booster is actuated to stop a vehicle and when a brake pedal continues to be depressed for a given time interval, a controller, not shown, energizes the solenoid 38. Thereupon, the plunger 41 and the valve means 42 are driven to the left as a unit against the resilience of the springs 43, 49, whereby the first valve element 46 becomes seated upon the valve seat 44 to close the passage 15. Under this condition, the braking action remains to be effective if the brake pedal ceases to be depressed, inasmuch as the atmosphere which has been introduced into the variable pressure chamber 5 cannot find its way into the constant pressure chamber 4.

If an accelerator pedal is now depressed or a gear shift takes place to connect a clutch, the controller mentioned above deenergizes the solenoid 38. Thereupon, since the pressure from the variable pressure chamber 5 acts upon the first valve element 46 and the second valve element 47, the first valve element 46 having an increased diameter cannot be moved away from the valve seat 44 while the second valve element 42 having a reduced pressure responsive area is moved to the right under the influence of the spring 43, thus opening the communication passage 45.

When the pressure in the variable pressure chamber 5 decreases as a result of such operation, the first valve element 46 is allowed to be driven to the right under the influence of the spring 49, thus allowing the variable pressure chamber 5 to communicate with the constant pressure chamber 4 through an increased channel area to thus reduce the pressure of the variable pressure chamber 5 rapidly.

When the solenoid 38 is energized, a magnetic path for the solenoid 38 is completed through the second casing 34, the spacer 35, the plunger 41, a gap defined between the plunger 41 and the plug 36. It will be seen that the spool 37 which is formed of synthetic resin is not interposed between the spacer 35 and the plunger 41 in distinction to the prior art, thus allowing the attractive force exerted upon the plunger 41 to be increased by a corresponding amount.

In addition, the spool 37 formed of synthetic resin and the plunger 41 formed of a metal exhibit different coefficients of thermal expansion, so that in a conventional solenoid valve, there has been a likelihood that a sliding movement of the plunger 41 may be prevented as a result of a sticking effect when the spool 37 is subject to a thermal constriction. However, when the sleeve-shaped guide **35*b* is fitted inside the spool 37 as in the present embodiment, a thermal constriction of the spool 37 can be prevented in such region, thus effectively suppressing a sticking effect of the plunger 41**.

In addition, the sleeve-shaped guide **35*b* formed of a metal which exhibits an increased rigidity is operative to guide a sliding movement of the plunger 41. This eliminates the likelihood that a sliding movement of the plunger 41 may be hampered by a deformation of the guide 35*b*. Fitting the sleeve-shaped guide 35*b* into the spool 37 and the recess 33*a* of the first casing 33** enables a reliable positioning therebetween.

Figure 4:
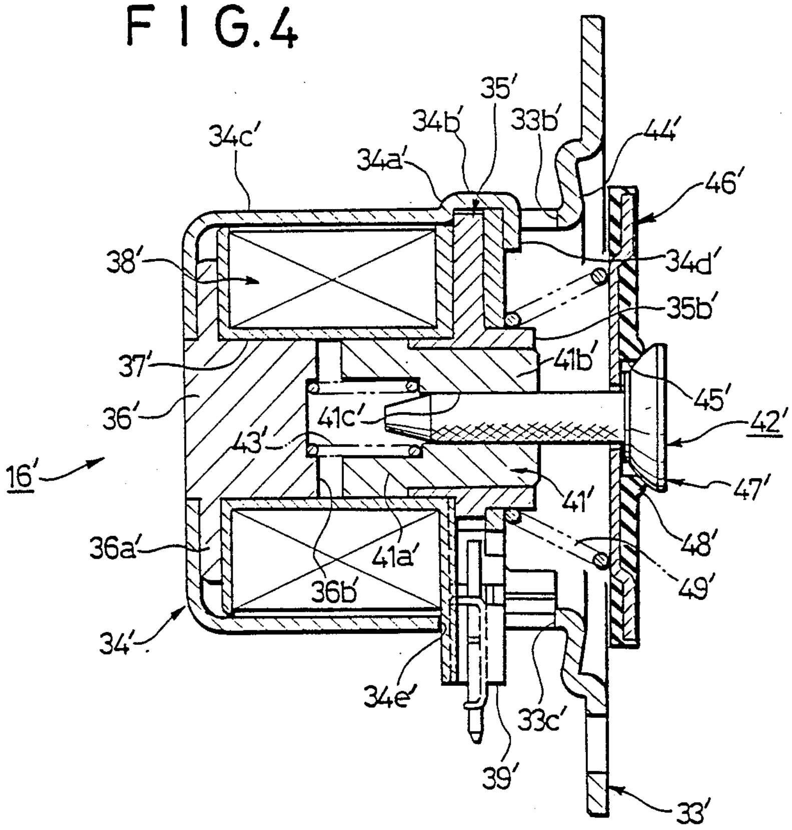
FIG. 4 is a schematic view, partly in section, of a solenoid valve according to another embodiment of the invention.

FIG. 4 shows another embodiment of the invention where a first casing 33' is again formed of a magnetic material while the recess **33*a* of the previous embodiment is omitted, and is replaced by a through-opening. A stepped end face of a plunger 41' is disposed in abutment against an end face of a sleeve-shaped guide 35*b*' of a spacer 35', thus maintaining the plunger 41'** at its inoperative position shown.

In other respects, the arrangement is identical to that of the previous embodiment, and corresponding parts are designated by like reference numerals as before, which are however primed. In this embodiment, it is possible to increase the area of the magnetic path in a region where the spacer 35 contacts the first casing 33.

Having described the invention in connection with several embodiments thereof, it should be understood that a number of changes, substitutions and modifications therein will readily occur to one skilled in the art from the above disclosure without departing from the spirit and scope of the invention defined by the appended claims.

What is claimed is:

1. A solenoid valve comprising a first casing having a valve seat formed thereon on which valve means may be seated, a second casing in the form of a cylinder having a closed bottom and connected to the first casing, a solenoid disposed on a cylindrical spool and contained within the second casing, an annular spacer interposed between the solenoid and the first casing and defining a magnetic path for the solenoid together with the second casing, and a plunger slidably fitted in the spool and connected to the valve means;

wherein the spacer includes an axial portion which is formed with a sleeve-shaped guide, which is fitted into the spool and in which the plunger is slidably fitted.

2. A solenoid valve according to claim 1 in which the plunger includes a portion of a greater diameter and another portion of a smaller diameter, the latter portion being slidably fitted into the sleeve-shaped guide of the spacer while the portion of a greater diameter is slidably fitted into the spool.

3. A solenoid valve according to claim 1 in which the sleeve-shaped guide of the spacer is fitted into a recess formed in the first casing, thereby radially positioning the spacer.

4. A solenoid valve according to claim 1 in which the sleeve-shaped guide of the spacer is fitted into a through opening formed in the first casing, thereby radially positioning the spacer.

5. A solenoid valve according to claim 1 in which the second casing includes a section of a smaller diameter which is located nearer the closed bottom thereof and another section of a greater diameter which is located nearer an opening thereof, the spacer including an annular portion which is fitted into the section of a greater diameter, with its outer periphery disposed in abutment against a stepped end face defined between the sections of a greater and a smaller diameter, thus axially positioning the spacer.

6. A solenoid valve according to claim 1 in which the solenoid is provided with a connector for connection with harness wires, the spacer including an annular portion in which a notch is formed for receiving the connector of the solenoid therein.

7. A solenoid valve according to claim 1 in which the valve means includes a first valve element in the form of a ring having a seat formed around its outer periphery which is adapted to be seated upon the valve seat, and a second valve element in the form of a poppet connected to the plunger and loosely and slidably extending through a communication passage formed in an axial portion of the first valve element, the arrangement being such that at the same time as the seat of the first valve element becomes seated upon the valve seat, the second valve element in the form of the poppet is caused to be seated upon the first valve element to close the communication passage.

8. A solenoid valve according to claim 1 in which a plug is mounted centrally in the bottom of the second casing, the plug including an axial portion which is fitted into the spool, the plug also including an annular portion which is disposed in abutment against the bottom surface of the second casing, the second casing including a section of a smaller diameter located nearer the bottom and another section of a greater diameter located nearer an opening thereof, the annular portion of the spacer being fitted into the section of a greater diameter with its outer periphery disposed in abutment against a stepped end face defined between the sections of a greater and a smaller diameter, the annular portion of the spacer and the annular portion of the plug being effective to hold the spool sandwiched therebetween.

* * * * *